Patented Jan. 30, 1934

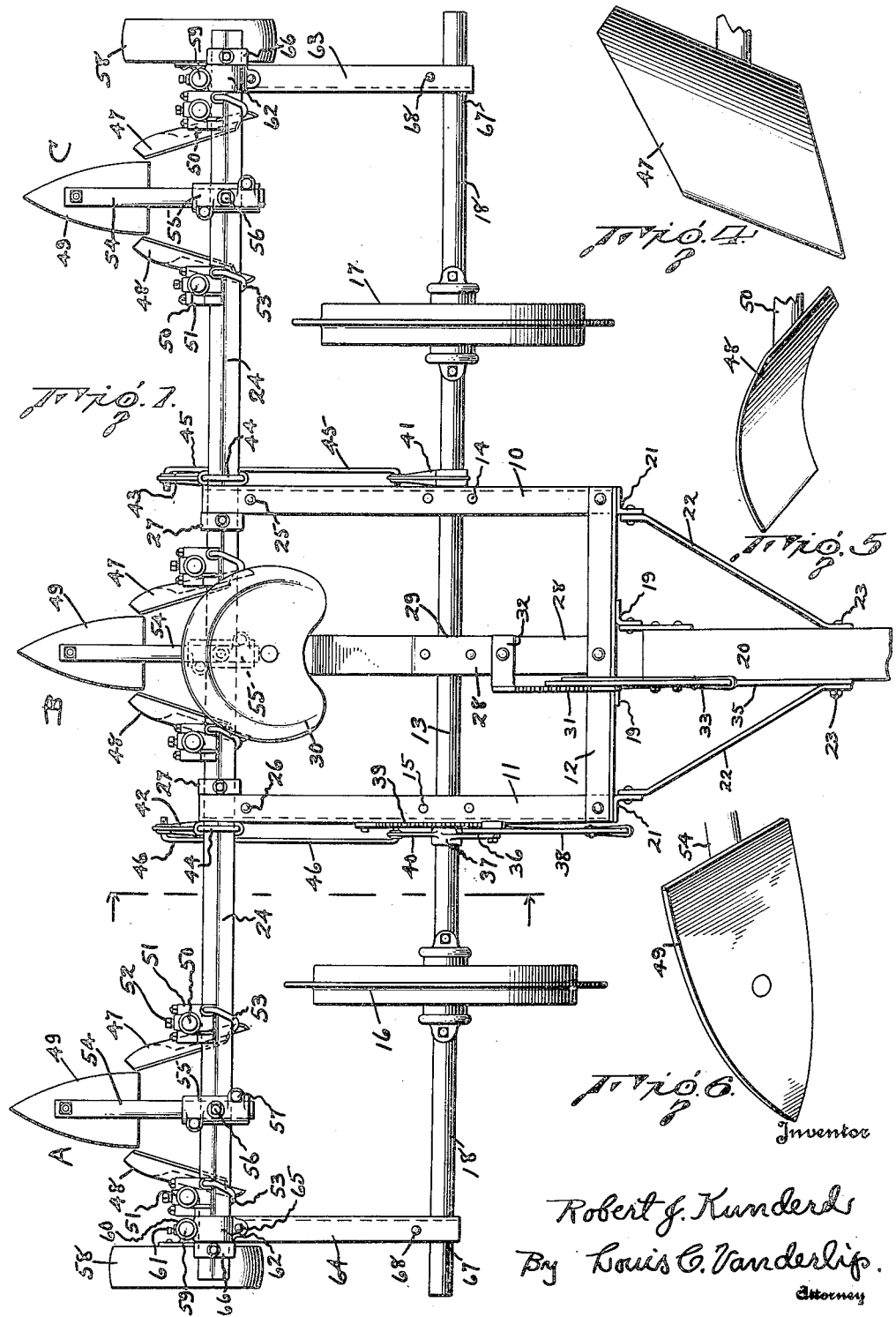

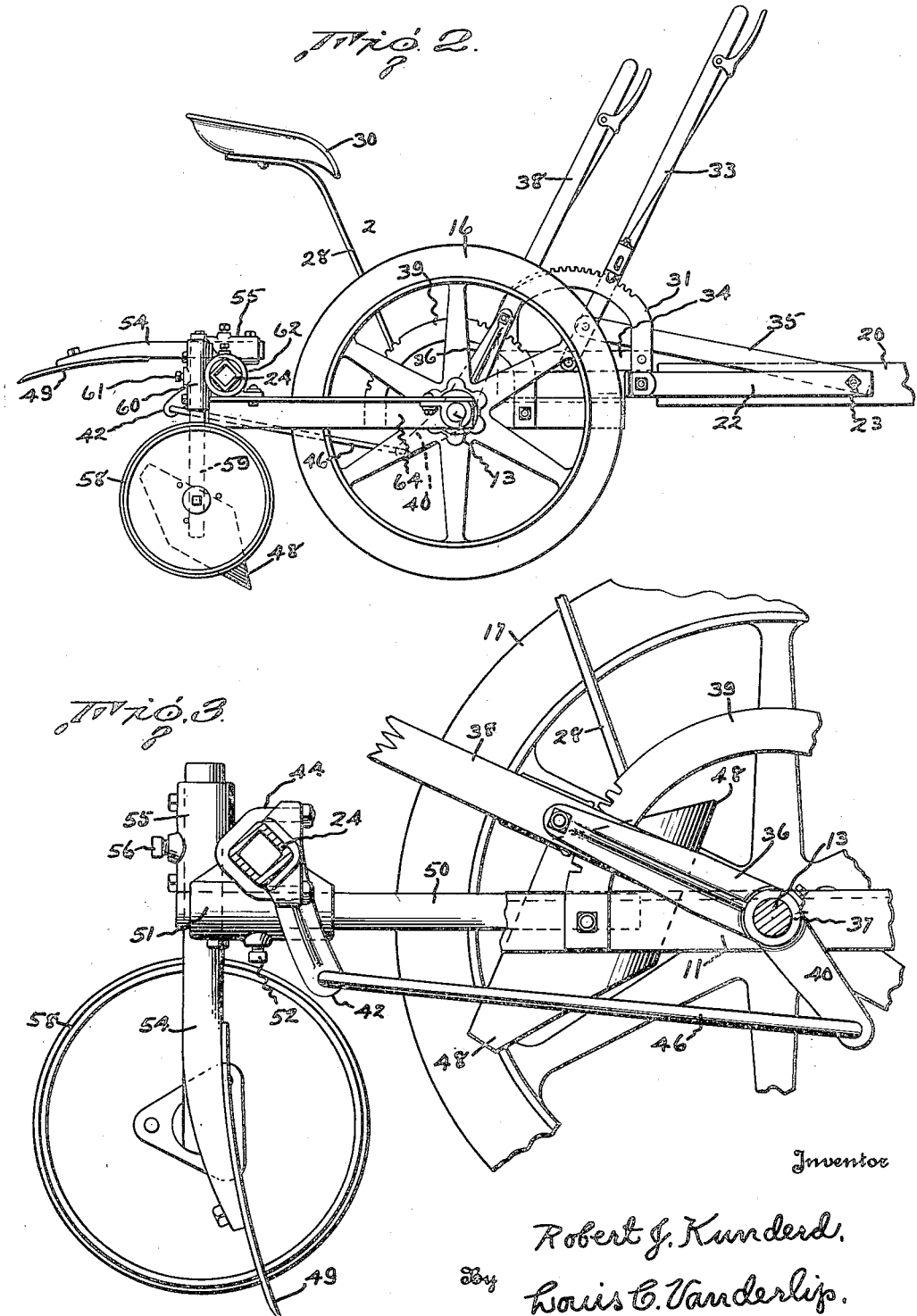

1,944,939

UNITED STATES PATENT OFFICE 1,944,939

COMBINED ROW MAKER AND COVERER

Robert J. Kunderd, Elkhart County, Ind.

Application November 11, 1931
Serial No. 574,329

6 Claims. (Cl. 97—56)

My invention relates to soil cultivating machines and particularly to a combined row maker or marker and hilling machine which is adaptable to the laying out and cultivation of row crops.

The principal object of my invention is to provide a row making and hilling or covering machine which carries a plurality of separate and distinct sets of earth working elements so arranged that their position with respect to the surface of the ground may be quickly and conveniently varied by the operator.

Another object of the invention is to provide a machine of the character described in which is mounted a universal bar upon which are mounted two or more separate and distinct sets of earth working elements so arranged that their position with respect to the surface of the ground may be quickly and conveniently varied by the operator. A third object of the invention is to provide a row making and hilling machine which carries a plurality of separate and distinct sets of earth working elements so arranged that the row making elements and hilling elements may be quickly, conveniently, and alternately brought into operative relation with the ground by the operator.

Other and more specific objects of the invention are mentioned and described herein.

The preferred embodiment of my invention is illustrated in the accompanying drawings, wherein Figure 1 is a top plan view of the complete row making and hilling machine illustrating the hilling shovels disposed in their operative positions;

Figure 2 is a side elevation of the machine showing the hilling shovels in their operative positions;

Fig. 3 illustrates a section taken on line 3—3 of Fig. 1 but showing the spear-point, or row making, shovels disposed in their operative positions and the hilling shovels elevated to inoperative position;

Figs. 4 and 5 illustrate two views of one of the hilling shovels, in perspective; and Fig. 6 illustrates a perspective of one of the row making shovels.

Similar numerals of reference indicate like parts throughout the several views on the drawings.

My combined row making and hilling machine is so designed that it has particular advantage in the planting of gladioli bulbs, and the like. Due to the susceptibility of the gladioli bulbs to injury in handling and to the exacting requirements in planting, it is necessary that they be placed in the ground by hand. The first requirement of this machine is to open up rows of furrows in which the bulbs are placed. This is done with a set of spear-point shovels hereinafter described. It then becomes necessary to change the machine from spear-point equipment to a set of covering or hilling shovels which move the soil, previously thrown out, into the center of the row, thereby covering the bulbs.

It is vital that the sequence of operations, viz: opening the furrow, setting the bulbs therein, and covering the bulbs, be completed as quickly as possible, so that the open furrows and the bulbs placed therein are not too long exposed. For this reason, the area to be planted is divided into smaller plots and the work is rotated from one plot to another, rather than completing each operation for the entire field.

It will therefore be evident that a machine carrying the full set of equipment required and capable of being quickly converted to perform the separate operations mentioned is extremely important to the economical and efficient handling of such work.

My improved combination machine contemplates a main frame which may comprise the spaced parallel side frame angle bars 10 and 11 and a transverse front frame angle bar 12, the latter being rigidly secured at its ends to the forward portion of said side frame bars. An axle 13 is provided extending transversely of the frame members 10 and 11 and may gain two bearings therein at 14 and 15, respectively, in any suitable manner, but preferably in suitable cast bearing elements—not shown—suitably secured by the bolts or rivets 14 and 15 to the under side of the angle bars 10 and 11. Carrying wheels 16 and 17 may be suitably mounted upon the axle 13 intermediate its extremities, said axle being provided with the extensions 18 for a purpose to be hereinafter referred to and described.

Secured to the forward flange of the front angle bar 12 of the frame are a pair of spaced angle brackets 19 between which brackets the pole 20 is pivotally mounted in any suitable manner. Another pair of brackets 21 pivotally support the extremities of the forwardly converging pole braces 22 which have their forward ends secured to the pole 20 at 23.

The numeral 24 indicates a tool bar which extends transversely of the machine frame and is suitably journaled in suitable bearing members secured to the under side of each of the side frame members 10 and 11 adjacent the rear extremity thereof at 25 and 26, respectively, and not shown, but which may be of the conventional type of box bearing in which said tool bar may freely rotate. Collars 27 rigidly mounted upon the tool bar adjacent the tool bar bearing boxes prevent axial movement of said tool bar in its bearings.

The numeral 28 indicates a seat spring which may have its forward end secured to the transverse frame member 12 intermediate the extremities of the latter and which extends rearwardly and may be supported by the axle 13 at 29, and which has a seat 30 mounted upon the rear and upper end thereof. The numeral 31 indicates a lever rack, of the usual notched type, which may be secured in any suitable manner in the machine frame, but as illustrated, its forward end is secured to one of the brackets 19, the rear end thereof being provided with a lateral arm 32 which is rigidly secured to the seat support 28 between the axle 13 and the frame member 12. A lever 33 is pivotally mounted intermediate the extremities of a horizontal bar 34 which in turn is rigidly mounted upon the lever rack 31. A latch mechanism carried by the lever 33 is adapted to engage the notches in the rack 31, whereby the desired relation of the lever with respect to the rack may be obtained and maintained. A link 35 connects the lever 33 with the pole 20 at 23, so that the position of the pole with respect to the frame may be varied by the lever 33.

The numeral 36 indicates a lever arm provided with a bored hub 37, said bored hub fixedly sleeving the axle 13 adjacent the outer side of the frame bar 11. A lever 38 is rigidly connected with the arm 36, said lever being provided with the usual retractible latch mechanism which is adapted to engage the notches of the lever rack 39, the latter being rigidly secured in the machine frame to effect the desired adjustments of the lever 38 with respect to the rack 39. The lever arm 37 is provided with an integral extension 40 adapted to function as hereinafter described. The position of the lever 38 about the axle 13 as its fulcrum is controlled by the latch mechanism carried thereby, and since the wheels 16 and 17 are loose upon said axle, it will be evident that movement of said lever effects rotation of said axle.

Positioned adjacent to the outer side of the frame bar 10 and rigidly mounted upon the axle 13 is a lever arm 41 which functions in unison with the arm 40 as the latter is oscillated by the lever 38. Clamped, or otherwise rigidly secured, to the tool bar 24, and positioned adjacent the outer sides of the frame bars 10 and 11 and the bearings for said tool bar, are lever or crank arms 42 and 43. As illustrated, the arms 42 and 43 are clamped to the tool bar by U bolts 44, but obviously, they may be otherwise rigidly fastened to the tool bar. The numerals 45 and 46 indicate a pair of connecting rods or actuating links forming a connection between the arms 42 and 43 of the tool bar 24 and the lever arms 40 and 41 mounted upon the axle 13, whereby a combination of elements is provided to rotate the tool bar 24 in its bearings and under the control of the lever 38.

The rotatable tool bar 24 carries a plurality of groups, three being illustrated, as generally indicated by the letters A, B, and C, of earth working elements, each group consisting of a right and left hand covering or hilling shovels, 47 and 48, respectively, set at a rearwardly converging angle to each other in order that the soil may be thrown inwardly, and a spear-point shovel 49 which is located midway between the covering shovels 47 and 48. Each shovel 47 and 48 is mounted upon a shank member 50 which is carried by a bearing member 51 which is provided with a socket in which the upper end of said shank is secured and rendered adjustable by a set screw 52, said bearing member 51 being rigidly secured to the tool shaft 24 by a modified U bolt 53. Obviously, therefore, the shovel shanks 50 may be adjusted in their sockets provided in bearing member 51 to vary the distance of the shovel from the soil, and thereby the depth of the furrow.

Each of the spear-point shovels 49 is mounted upon a shank 54 which has its upper end slidably mounted in a bearing member 55, which may take the form of a sleeve which is rigidly attached to the tool bar 24, each shovel shank being rendered adjustable by a set screw 56. A modified form of U bolt 57—not fully shown—may be used to secure the sleeve members 55 to the tool bar 24.

Preferably and conveniently the spear-point shovels 49 and their shanks, and the covering shovels 47 and 48 and their shanks, are mounted on the bar 24 at an angle to each other, which angle may be ninety degrees, or approximately such an angle. With this arrangement of shovels, when one set of the shovels is in a vertical or working position the other set is positioned in a horizontal and inoperative position. And the change of shovels to perform one or the other operation is immediately and conveniently controlled by the operator through the actuation of the lever 38, and it is this combination and arrangement of elements that forms the important features of this invention.

The relative working depth of the shovels is controlled by gauge wheels 58 which are located at the extreme ends of the tool bar 24, said gauge wheels being carried upon shanks 59 each of which is vertically and adjustably clamped in a socket provided in a sleeve member 60 by means of a set screw 61. Each of the sleeves 60 is preferably formed integral with a bored bearing member 62, the bore whereof serving as a bearing for the tool bar 24 wherein the latter is freely rotatable, said bearing members 62 being rigidly secured to the extremities of the opposed fore and aft angle bars 63 and 64, as by bolts 65, or otherwise in any suitable manner. The construction described maintains the gauge wheels 58 in a substantial vertical or ground contact position without regard to the rotation of the tool bar 24 in the alternate shift of the shovels 49 and the hilling shovels 47 and 48. A pair of set collars 66 holds the bearing members 62 in their proper lateral location on the tool bar 24, and the forward ends of the angle bars 63 and 64 are hingedly connected with the axle 13 in any suitable manner, as by box bearings—not shown— which may be positioned on the under side of the flange of each of said bars at 67, and which may be secured thereto by bolts 68.

I claim:—

1. In a machine of the character described, the combination of a main frame provided with an axle and carrier wheels, a revoluble carrier bar supported by said main frame, adjustable gauge wheels for supporting said carrier bar at a predetermined distance from the ground, a pair of spaced implement carrying shank elements mounted upon said carrier bar and projecting radially therefrom, an individual implement carrying shank element mounted upon said bar between said pair of shank elements and projecting radially therefrom at an angle in relation to said pair of shank elements.

2. In a machine of the character described, the combination of a main frame provided with an axle and carrier wheels, a revoluble carrier bar supported by said main frame, a plurality of adjustable gauge wheels associated with said carrier bar for supporting the latter at a predetermined distance from the ground, a plurality of pairs of spaced implement carrying shank elements mounted upon said carrier bar and projecting radially therefrom, and an individual implement carrying shank element mounted upon said carrier bar between the two shank elements of each pair of implement carrying shank elements and projecting radially from said bar at an angle in relation to said pair of shank elements.

3. In a machine of the character described, the combination of a main frame provided with an axle and carrier wheels, a revoluble carrier bar carried by said main frame, adjustable gauge wheels for supporting said revoluble bar at a predetermined distance from the ground, a pair of spaced implement carrying shank elements mounted upon said bar and projecting radially therefrom, means for adjusting said shank elements axially thereof, an individual implement carrying shank element mounted upon said bar between said pair of shank members, projecting radially therefrom and at an angle in relation to said pair of shank elements, and means for adjusting said individual shank element axially thereof.

4. In a machine of the character described, the combination of a main frame provided with an axle and carrier wheels, a revoluble carrier bar carried by said main frame, adjustable gauge wheels for supporting said revoluble bar at a predetermined distance from the ground, a pair of spaced cooperating implement carrying shanks, bearing members for said shanks mounted on said bar and with which said shanks are rigidly connected, said shank elements extending radially in relation to said bar, an individual implement carrying shank element arranged between said pair of shank elements radially of said bar, a bearing member for said individual shank element mounted upon said bar and with which said shank element is rigidly connected, said individual shank element projecting at an angle in relation to said pair of shank elements.

5. In a machine of the character described, the combination of a main frame provided with an axle and carrier wheels, a revoluble carrier bar carried by said main frame, adjustable gauge wheels for supporting said carrier bar at a predetermined distance from the ground, a pair of spaced implement carrying shank elements mounted upon said carrier bar and projecting radially therefrom, an individual implement carrying shank element mounted upon said carrier bar between said pair of shank elements, projecting radially therefrom and at an angle in relation to said pair of shank elements, and link and lever means for rotating said carrier bar.

6. In a machine of the character described, the combination of a main frame provided with an axle and carrier wheels, a revoluble carrier bar mounted upon said main frame, gauge wheels associated with said revoluble carrier bar to regulate the distance of the latter from the ground, means for adjustably mounting said gauge wheels in relation to said carrier bar, said means including a plurality of bar elements, which are hinged at one end thereof to said axle, and a carrier bar bearing member supported adjacent the opposite end of each of said hinged bar elements, a pair of spaced implement carrying shank elements adjustably mounted upon said carrier bar and projecting radially therefrom, and an individual implement carrying shank element adjustably mounted upon said carrier bar between said pair of shank elements, projecting radially therefrom and at an angle in relation to said pair of shank elements.

ROBERT J. KUNDERD.